United States Patent [19]
Orthmann et al.

[11] Patent Number: 5,908,913
[45] Date of Patent: Jun. 1, 1999

[54] PROCESS FOR THE CONTINUOUS PRODUCTION OF POLYURETHANE AND POLYURETHANE UREA PREPOLYMERS

[75] Inventors: Ernst Orthmann, Dormagen; Klaus Wulff, Krefeld; Peter Hoeltzenbein, Dormagen; Helmut Judat, Langenfeld; Hans Wagner, Dormagen; Gottfried Zaby, Leverkusen; Herbert Heidingsfeld, Frechen, all of Germany

[73] Assignee: Bayer Aktiengesellschaft, D-51368 Leverkusen, Germany

[21] Appl. No.: 08/164,227

[22] Filed: Dec. 7, 1993

Related U.S. Application Data

[63] Continuation-in-part of application No. 08/008,957, Jan. 26, 1993, abandoned.

[30] Foreign Application Priority Data

Feb. 3, 1992 [DE] Germany .............................. 42 02 972

[51] Int. Cl.⁶ .................................................. C08G 18/08
[52] U.S. Cl. ................................ 528/49; 528/44; 528/69; 264/328.6
[58] Field of Search ................................ 528/44, 49, 69; 264/328.6

[56] References Cited

U.S. PATENT DOCUMENTS

| 3,963,679 | 6/1976 | Ullrich et al. ...................... 260/75 NE |
| 4,250,292 | 2/1981 | Niederdellmann et al. ............... 528/44 |
| 4,261,946 | 4/1981 | Goyert et al. ........................... 264/211 |
| 4,334,783 | 6/1982 | Suzaka ...................................... 366/69 |
| 5,117,048 | 5/1992 | Zaby et al. .............................. 560/347 |

FOREIGN PATENT DOCUMENTS

| 087817 | 9/1983 | European Pat. Off. . |
| 2823762 | 12/1978 | Germany . |

OTHER PUBLICATIONS

F.M. Sweeney; Intro to Reaction Injection Molding; 1979; pp. 90–101.

*Primary Examiner*—Rachel Gorr
*Attorney, Agent, or Firm*—Joseph C. Gil

[57] ABSTRACT

The invention relates to the continuous production of polyurethane and polyurethane urea prepolymers by reaction of polyisocyanates with isocyanate-reactive compounds in a mixing nozzle.

12 Claims, 1 Drawing Sheet

PROCESS FOR THE CONTINUOUS PRODUCTION OF POLYURETHANE AND POLYURETHANE UREA PREPOLYMERS

CROSS REFERENCE TO RELATED APPLICATION

This application is a continuation-in-part of U.S. application Ser. No. 08/0,008,957, filed on Jan. 26, 1993, now abandoned.

BACKGROUND OF THE INVENTION

The present invention relates to a process for the continuous production of polyurethane and polyurethane urea prepolymers by reaction of polyisocyanates with polyhydroxy compounds or polyamine compounds having molecular weights of 400 to 10,000. It is known that such prepolymers can be produced from polyisocyanates and polyhydroxyl and/or polyamino compounds. Various production processes for such prepolymers are known in the art.

Prepolymer production processes carried out in a reaction vessel of the type described in Ullmann's Encyklopadie der technischen Chemie, Vol. 19, Chap. 9.3, Verlag Chemie, Weinheim (1982) are attended by the disadvantage that the chemical and physical properties of the prepolymers (such as reactivity, degree of crosslinking and viscosity) change unfavorably during their reaction to polyurethane elastomers, so that uniform production is not possible.

Continuous production processes using mixing heads are also described in the same reference. However these processes have the disadvantage that mixing can only be carried out to a limited degree and only with starting materials of chemically the same type. Another problem is that it is difficult to seal the places where the shafts of the mixing elements pass through the housing of the mixing head against the internal pressure and the non-lubricating and sealing medium of the polyisocyanates. Accordingly, relatively high pressures cannot be used. A continuous process in which the prepolymers are produced in a twin-screw extrude with co-rotating screws and self-cleaning screw geometry at temperatures of 70 to 260° C. is described in German Offenlegungsschrift 2,842,806. The disadvantages of this process are that the components are very thinly liquid at the temperatures mentioned, the mixing effect obtained by two co-rotating shafts is not great and the residence time is too short for a complete reaction.

German Offenlegungsschrift 2,302,564 mentions small-volume, stirred mixing chambers and mixing nozzles for mixing for the production of prepolymers. Mixing nozzles are known elements for mixing liquids. Detailed particulars of the geometry of the mixing nozzle and the arrangement of the volume flows or pressure conditions are not provided. In the Examples, a mix head rather than mixing nozzles is used for the production of prepolymers from polyisocyanates and polyol mixtures. A process using a mixing nozzle is not described.

German Offenlegungsschrift 2,823,762 describes a continuous process in which the starting components are passed through a static premixer, in which they are intermixed, the product temperature being so low that a reaction is largely avoided, thus preventing the products from caking. Although thorough mixing is achieved by this process, separation in the reaction zone is not prevented by suppression of the reaction at low temperatures. The prepolymer does not have sufficient reaction time in the following step to react out completely and uniformly.

European Patent 87,817 describes a process for the production of prepolymers in which the components are introduced into a static mixer comprising internally arranged heat exchangers. Optimal mixing is achieved by internally mounted mixing elements which also provide for a residue-free plug flow in the system. This process is only suitable for low-viscosity prepolymers and only for production runs with no change of raw materials. This is because residues (in some cases even over-crosslinked and brown in color) gradually accumulate in the mixing elements and, after the reaction to thermoplastic elastomers, give rise during their use to contamination of the end product in the event of product changes or to infusible particles in extrudates, such as films.

Accordingly, the problem addressed by the present invention was to provide a new process for the continuous production of polyurethane and polyurethane urea prepolymers by reaction of polyisocyanates with polyhydroxyl compounds and/or polyamine compounds having molecular weights of 400 to 10,000, in which a) the components would be mixed and, at the same time, be very finely dispersed, b) rotating parts would not cause any sealing problems relative to the outside environment, c) sufficient reaction time would be available for a complete reaction, i.e. until the prepolymer has reacted with chain extenders, such as short-chain diols or diamines, to the thermoplastic polyurethane, d) the equipment used would be easy to clean and would not lead to any caking of product or blockages in the system.

DESCRIPTION OF THE INVENTION

Figure 1:
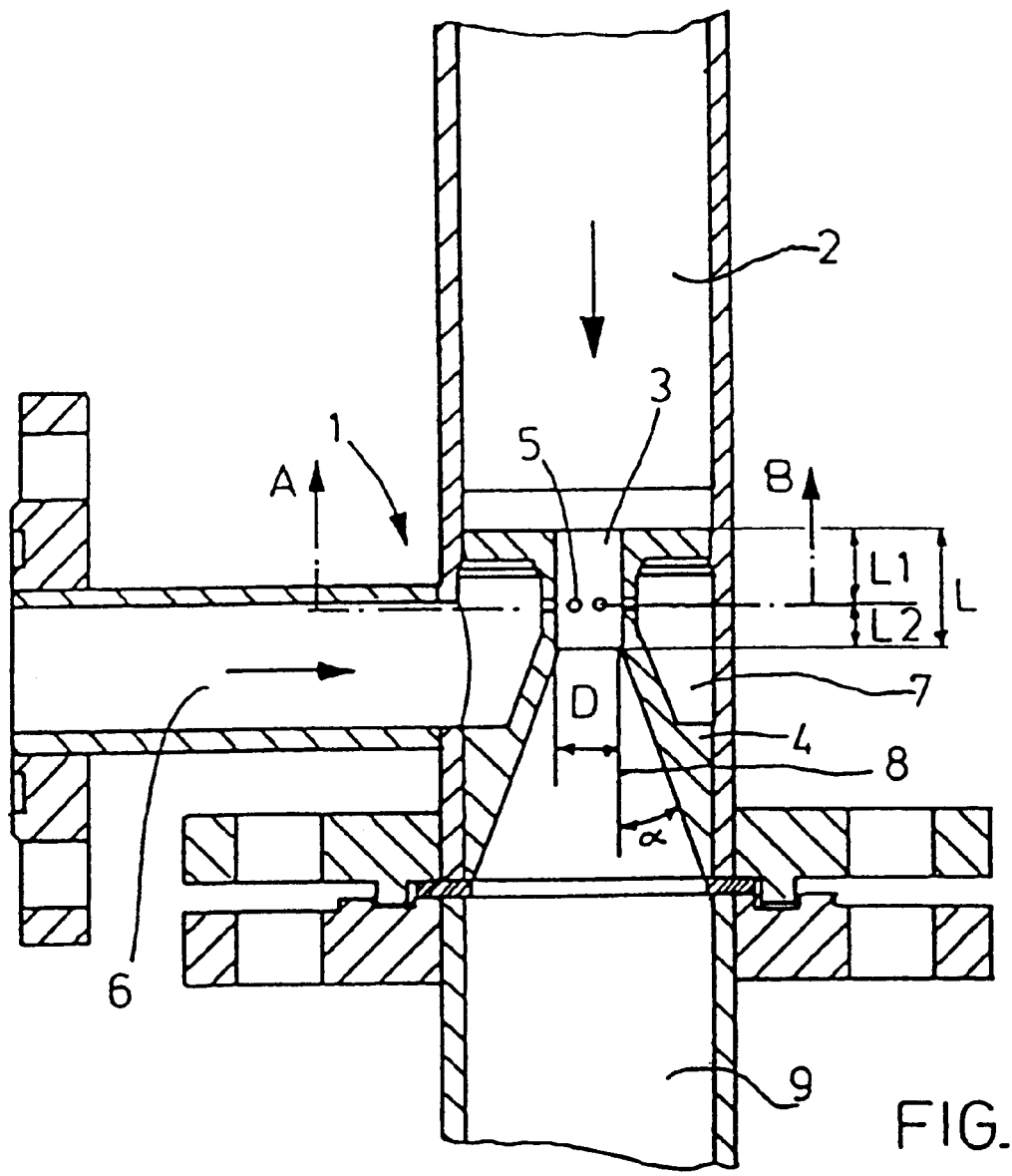
FIG. 1 is a longitudinal section through a nozzle useful in the present invention.
Figure 2:
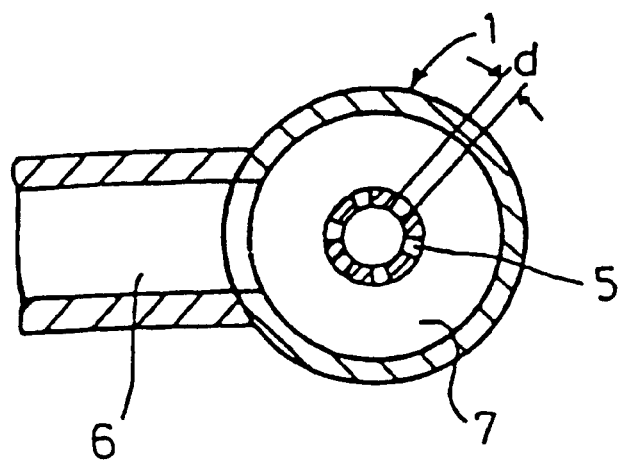
FIG. 2 is a sectional view on the line A-B of FIG. 1.

The present invention resides in combining the polyisocyanates and the polyhydroxy compounds or the polyamine compounds in a special nozzle. More particularly, the present invention is directed to a process for the continuous production of polyurethane and polyurethane urea prepolymers by the reaction of A) one or more organic polyisocyanates, B) one or more isocyanate-reactive compounds having molecular weights of from 400 to 10,000 and being selected from the group consisting of polyhydroxy compounds, polyamine compounds, and mixtures thereof, C) optionally in the presence of one or more monofunctional compounds, such as monoisocyanates, monoalcohols or monoamines, and D) optionally in the presence of activators, stabilizers, lubricants and other additives, wherein the amounts of reactive components is such that the equivalent ratio of isocyanate groups to isocyanate-reactive groups is from 11.1:1 to more than 1.15:1 or 0.85:1 to less than 0.1:1.

The present invention comprises combining the components (i.e., A) through D)) in a nozzle which has a constriction wherein a) either the isocyanate-containing components or the isocyanate-reactive components are passed axially through the constriction of the nozzle, b) the other components are introduced laterally into the stream of components passing through the constriction via several bores distributed over the periphery of and in the walls of said constriction, and c) the resultant mixture passes through a pipe in which the components react to form the product (i.e., the prepolymer). The pipe preferably has no fittings.

It has surprisingly been found that this process can be carried out with low pressure losses. In addition, despite short residence times, a high degree of conversion can be obtained through the extremely good mixing effect of the nozzle. In kinetic studies, it was found that the prepolymer reaction generally takes at least two minutes, even at 200° C. It was believed that since such a residence time would not be possible using a pipe system. However, it has surprisingly been found that far shorter reaction times are necessary when using the nozzle of the present invention and that 100% conversion can be obtained, even at lower temperatures.

The nozzle used is also called an annular nozzle. The constriction of the first stream may take place suddenly or steadily. Since, in general, a pressure loss of only about 3 bar is necessary for obtaining optimal mixing in the annular nozzle, the pressures of the component streams may generally be kept low. Accordingly, the usual pumps may be used and any existing pipe systems may be retained. However, higher pressure losses may also be applied providing the disadvantage of higher component pressures is accepted.

Polyisocyanates A) suitable for use in the invention include any of the aliphatic, cycloaliphatic, araliphatic, aromatic and heterocyclic diisocyanates known in the art. Diisocyanates preferably used in accordance with the invention are aromatic diisocyanates such as naphthylene-1,5-diisocyanate; 3,3'-dimethyl-4,4'-diisocyanatodiphenyl (TODI); 1,4-diisocyanatobenzene and the correspondingly hydrogenated product; tolylene diisocyanates; and, most particularly, the diphenyl methane diisocyanates. It is particularly preferred to use 4,4'-diisocyanatodiphenyl methane or its isomer mixtures with up to 5 mol-% and preferably 1 to 4 mol-% 2,4'-diisocyanatodiphenyl methane, generally accompanied by very small quantities of the 2,2'-diisocyanatodiphenyl methane isomer.

The diisocyanates may be used with up to about 15 mol-% (based on diisocyanate) of a polyisocyanate of higher functionality. However, the quantity in which the higher polyisocyanate is used must be limited to such an extent that a still meltable or thermoplastic polyurethane elastomer is obtained after the prepolymers according to the invention have been subsequently processed to thermoplastic polymers. A relatively large quantity of higher isocyanates generally has to be compensated by the use of on average less than difunctional hydroxyl or amino compounds or even monoisocyanates, so that excessive chemical crosslinking of the product is avoided. Examples of isocyanates of relatively high functionality and monofunctional compounds C) can be found in the prior art cited above.

Monoamines, such as butyl or dibutyl amine, aniline, hydroxyl amine, stearyl amine, piperidine, and N-methyl stearyl amine; and monoalcohols, such as 1-butanol, 2-ethyl-1-hexanol, 1-dodecanol, isobutanol or tertiary butanol, cyclohexanol, ethylene glycol monomethyl ether, 1-octanol and stearyl alcohol are examples of suitable monofunctional components.

When used, the monofunctional compounds are used in relatively small quantities, for example in quantities of 0.01 to 4% by weight, based on the weight of all the reactive components.

Preferred hydroxy functional, relatively high molecular weight compounds B) are polyester, polyester carbonate and polyether diols, for example polyester diols of linear or branched, aliphatic and/or cycloaliphatic diols and aliphatic dicarboxylic acids, more particularly adipic acid. However, they may also contain small quantities of aromatic dicarboxylic acids, more particularly phthalic acid and even terephthalic acid, and hydrogenation products thereof. Hydroxyl polycarbonates and hydroxy polycaprolactones are also suitable. Also preferred are hydroxyether diols based on ethylene oxide, propylene oxide or mixed polyethers of propylene oxide and/or ethylene oxide and/or tetrahydrofuran, for example hydroxyether diols based on tetrahydrofuran having molecular weights of from 1000 to 3000. Suitable polyols are described in detail, for example, in German Offenlegungsschriften 2,302,564, 2,402,840, 2,423,764, 2,549,372, 2,854,384, 2,920,501 and 3,405,531, U.S. Pat. Nos. 3,963,679, 3,984,607, and 4,035,213, and German Auslegeschrift 2,457,387.

Relatively high molecular weight polyamine compounds B), preferably containing primary aromatic amino groups, may also be used. Preferred representatives are obtained, for example, by (preferably basic) hydrolysis of the corresponding isocyanate prepolymers based on relatively high molecular weight polyhydroxy compounds and excess aromatic diisocyanates. Examples of these polyamines can be found in German Auslegeschriften 2,948,419, 3,039,600, and 3,112,118, and European patents 61,627, 71,132 and 97,869. The '419 reference also mentions other known processes for the production of aromatic amino compounds of relatively high molecular weight (so-called aminopolyethers) which are suitable for use in the process according to the invention. Other production processes are described in French Patent 1,415,317, and in German Auslegeschriften 1,694,152 and 1,155,907.

The usual auxiliaries D), such as catalysts, release agents, antistatic agents, flameproofing agents and pigments corresponding to the prior art (see, for example, German Auslegeschrift 2,854,409, German Offenlegungsschrift 2,920,501 and German Patent 3,329,775), may of course be added before and/or during and/or after the polyurethane reaction. Antioxidants and UV absorbers (light stabilizers) may also be added in accordance with the prior art (see, e.g., German Auslegeschrift 3,405,531). Suitable catalysts include, for example, tertiary amines, organometallic compounds, more particularly organotin compounds, organolead compounds and organotitanium compounds, for example tin(II) acetate, tin(II) ethyl hexoate, dibutyl tin dilaurate or lead acetate. Preferred release agents are waxes and oils and, for example, long-chain compounds containing carboxyl, ester, amide, urethane or urea groups and silicones, for example of the type mentioned as release agents in German Offenlegungsschrift 2,204,470.

In the process according to the invention, the quantities of reaction components A) to D) for the polyurethane or polyurethane urea prepolymers are generally selected so that the equivalent ratio of isocyanate groups to isocyanate-reactive groups is from 11:1 to more than 1.5:1 and preferably from 6:1 to 3:1 or 0.85 to less than 0.1:1 and preferably 0.8:1 to 0.5:1.

The components mentioned may be homogenized in the annular nozzle in pure form, in admixture with one another or in the form of partly reacted mixtures and subsequently reacted.

The streams introduced into the nozzle are either 1) the isocyanate-containing component and
2) all the remaining components, or
3) the isocyanate-reactive components and
4) all the remaining components.

In either case, whichever of the components is used in the larger volume is preferably guided axially through the constriction of the nozzle. In other words, the larger volume component is guided axially through the constriction. For example, if the isocyanate-containing component is the larger volume component when compared to the volume of the remaining components, then the isocyanate component will be guided axially through the constriction. Where substantially the same volume of components are used, each of the two components may form the middle stream or sidestream. Observing these measures ensures optimal mixing and, hence, a satisfactory reaction.

The polyisocyanate-containing component stream is preferably passed through the side bores if the volume stream is smaller than the volume stream of the polyol or polyamine component.

If several prepolymer nozzles according to the invention are arranged in tandem to mix a prepolymer and optionally polyisocyanate-containing component with other components, such as a polyol or polyamine component or liquid additives, the polyisocyanate-containing component stream may also form the main stream.

In one preferred embodiment, a flow rate of 1 to 10 m/sec. is maintained in the constriction. However, higher flow rates, for example up to 50 m/sec., can be maintained in the constriction providing the disadvantage of the high pump pressure required for this purpose is accepted. Conversely, the pump pressure can of course advantageously be kept low at the preferred flow rate of 1 to 10 m/sec.

The constriction preferably has a constant diameter D over its entire length L. The length L is preferably at least twice the diameter D of the constriction. This configuration provides for particularly intensive mixing and adequately stabilizes the flow conditions.

In one particularly advantageous embodiment, the length $L_1$ of the constriction of the axial stream to the point where it is combined with the streams of the second component is between 0.5 and 2 times the diameter D of the constriction.

The product stream resulting from the two reaction streams is subjected to a constant constriction having a length $L_2$ that is at least equal to the length of the path in which the reaction of components is substantially completed. The length $L_2$ is generally at most four times the diameter D. Larger dimensions of $L_2$ result in higher pressure drops without providing any advantage.

The dimensions described above ensure that mixing in the nozzle is optimal and that there is no caking of product.

A particularly high yield can be obtained with a ratio of the axial stream $\epsilon_A$ to the lateral stream $\epsilon_s$ of from 0.01 to 1.0, and preferably from 0.02 to 0.5 and, most preferably, from 0.03 to 0.25. This ratio is calculated according to the following formula:

$$\frac{\varepsilon_A}{\varepsilon_S} = \frac{\delta_A \cdot V_A \cdot v_A^2}{\delta_S \cdot V_S \cdot v_S^2}$$

where $\delta$ is the density (in kg/m$^3$), V is the volume of the particular stream (in m$^3$/sec) and v is the flow rate of the particular stream (in m/sec), with the subscript A representing the axial stream and the subscript S representing the lateral stream.

The high yield obtainable in this way also guarantees a low energy input and short dwell zones.

In another particular embodiment, the flow cross-section is steadily enlarged after the constriction. This rules out the possibility of swirling and backflow. It is obvious that the widening of the flow cross-section ends at a maximum which corresponds to the diameter of an adjoining pipe. Avoiding backflow ensures a uniform reaction time, i.e. residence time of the prepolymer pending further processing.

In another variant of the process, the number i of bores for the lateral streams is between $2 \leq i \leq m$ and preferably between $4 \leq i \leq m$, m being derived from the condition:

$$\frac{\pi \cdot D}{m \cdot d} \geq 1.1,$$

preferably >1.5 and, most preferably, >2, with D being the diameter of the constriction and d being the diameter of the bores. This measure also has a favorable effect on mixing and hence on the reaction.

All the bores are preferably arranged in a common plane perpendicular to the constriction although other arrangements are also possible. This ensures that the reaction can only start in this plane, i.e. already reacting product no longer comes into contact with the second component.

Since the polyol/polyamine mixture generally represents the greater volume stream, it is generally passed through the constriction in accordance with the foregoing observations.

The mixing unit crucial to the invention is described in more detail with reference to the accompanying drawings with the reference numerals used in the drawings having the following meanings:

(1) nozzle to be used in accordance with the invention
(2) feed pipe for the main stream
(3) sudden constriction of the main stream
(4) insert with built-in lateral bores causing the constriction
(5) side bores
(6) feed pipe for the sidestream
(7) chamber surrounding the constriction (3) from which the bores (5) lead away
(8) steady widening at the nozzle exit
(9) discharge pipe (i.e., dwell zone)
D internal diameter of the constriction
d diameter of the side bores
L overall length of the constriction
$L_1$ distance from the beginning of the constriction to the plane of the side bores
$L_2$ distance from the plane of the side bores to the beginning of the steady widening.

Nozzles of the type useful herein are known for use in the production of isocyanates from amines and phosgene (see, e.g., U.S. Pat. No. 5,117,048).

The production of reaction mixtures using the mixing unit according to the invention may be carried out, for example, according to the following description.

The main stream is delivered to a nozzle (1) through a feed pipe (2) which suddenly changes into a constriction (3) arranged in the nozzle (1). The constriction (3) is arranged in an insert (4). The constriction (3) has a constant diameter D over its entire length L. In the section $L_1$ which corresponds, for example, to 1.5 times the diameter D of the constriction (3), bores (5), for example six in number, are regularly distributed over the circumference. Mutually opposite bores (5) are offset from one another by the diameter d so that the streams sprayed in pass by one another. The second component is delivered through a feed pipe (6) to a chamber (7) surrounding the constriction (3) from which the bores (5) lead off. The length $L_2$ of the constriction (3) behind the bores (5) corresponds, for example, to the diameter D of the constriction (3). Behind the constriction (3), the nozzle (1) undergoes constant widening (8) at an angle α with the axis of, for example, 20°. The widening (8) is adjoined by a discharge pipe (9) of the same diameter as the feed pipe (2). The discharge pipe serves as a dwell zone and may be adapted in length and diameter so that, under the selected reaction conditions, a complete reaction and possibly even a desired degree of branching is exactly achieved when the prepolymer is further reacted.

To avoid a relatively broad residence time spectrum in the case of relatively large diameters, fittings may be introduced to equalize differences in flow rate from the inside of the pipe to its periphery.

The reaction mixtures prepared using the mixing unit critical to the invention may be reacted with short-chain diols, diamines or hydroxylamines to form thermoplastic polyurethanes or polyurethane ureas by known methods as described, for example, in German Offenlegungsschriften 2,302,564, 2,447,368, 2,549,372, 2,823,762, 2,842,806 and 3,224,324.

The invention is illustrated by the following Examples.

EXAMPLES

Example 1

100 parts by weight of a polyester of adipic acid and 1,4-butanediol (OH value 50, acid value 0.7), which had been activated with 10 ppm titanium tetrabutylate, were continuously mixed with 150 parts by weight liquid 4,4'-diisocyanatodiphenyl methane in a constant ratio in the special described nozzle to form a prepolymer and reacted in the following dwell zone by passing the polyester through the constriction and laterally delivering the liquid 4,4'-diisocyanatodiphenyl methane through the bores. A sample of the reaction product formed was taken and its residual isocyanate content was determined by potentiometric titration with dibutyl amine solution and alcoholic hydrochloric acid.

Residual NCO content=18.91%, corresponding to a 96.8% conversion to the prepolymer; theoretical content for 100% conversion=18.95%.

Example 2

50 parts by weight of a polyester of adipic acid and 1,4-butanediol (OH value 50, acid value 0.7), which had been activated with 10 ppm titanium tetrabutylate, and 50 parts by weight of a polycarbonate diol of diphenyl carbonate and 1,6-hexanediol were continuously mixed with 49 parts by weight liquid 4,4'-diisocyanatodiphenyl methane in a constant ratio in the special described nozzle to form a prepolymer and reacted in the following dwell zone by passing the mixture of polyester and polycarbonate diol through the constriction and laterally delivering the liquid 4,4'-diisocyanatodiphenyl methane through the bores.

A sample of the reaction product formed was taken and its residual isocyanate content was determined by potentiometric titration with dibutyl amine solution and alcoholic hydrochloric acid.

Residual NCO content=8.64%, corresponding to a 99.8% conversion to the prepolymer; theoretical content for 100% conversion=8.65%.

Example 3

50 parts by weight of a polytetramethylene oxide ether (molecular weight 1000), and 50 parts by weight of a polytetramethylene oxide ether (molecular weight 3000), were continuously mixed with 96 parts by weight liquid 4,4'-diisocyanatodiphenyl methane in a constant ratio in the special described nozzle to form a prepolymer and reacted in the following dwell zone by passing the polyether mixture through the constriction and laterally delivering the liquid 4,4'-diisocyanatodiphenyl methane through the bores. A sample of the reaction product formed was taken and its residual isocyanate content was determined by potentiometric titration with dibutyl amine solution and alcoholic hydrochloric acid.

Residual NCO content=13.72%, corresponding to a 98.7% conversion to the prepolymer; theoretical content for 100% conversion=13.55%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the continuous production of polyurethane and polyurethane urea prepolymers by reaction of
   A) one or more organic polyisocyanates, with
   B) one or more isocyanate-reactive compounds having molecular weights of from 400 to 10,000 and being selected from the group consisting of polyhydroxy compounds, polyamine compounds, and mixtures thereof,
   C) optionally in the presence of one or more monofunctional compounds, and
   D) optionally in the presence of activators, stabilizers, lubricants and other additives, with the quantities of reactive components being selected such that the equivalent ratio of isocyanate groups to isocyanate-reactive groups is from 11.1:1 to more than 1.5:1, the improvement wherein the components are combined in a nozzle which has a constriction and wherein
   a) either the isocyanate-containing components or the isocyanate-reactive components are passed axially through the constriction of the nozzle,
   b) the other components are introduced laterally into the stream of components passing through the constriction via several bores distributed over the periphery of and in the walls of said constriction, and
   c) the resultant mixture passes through a pipe in which the components react to form a product stream.

2. The process of claim 1, wherein whichever component has the larger volume is passed through the constriction.

3. The process of claim 1, wherein a flow rate of 1 to 10 m/sec. is maintained in the constriction.

4. The process of claim 1, wherein the constriction has a constant diameter over its length.

5. The process of claim 4, wherein the length corresponds to at least twice the diameter of the constriction.

6. The process of claim 1, wherein the length of the constriction of the axial stream to the point where it is combined with the lateral streams of the second component is between 0.5 and 2 times the diameter of the constriction.

7. The process of claim 1, wherein the product stream resulting from both streams is subjected to a constant constriction over a length of at most four times the diameter of the constriction.

8. The process of claim 1, wherein the ratio of the axial stream $\epsilon_A$ to the lateral stream $\epsilon_S$ is from 0.01 to 1.0 and is calculated according to the formula:

$$\frac{\varepsilon_A}{\varepsilon_S} = \frac{\delta_A \cdot V_A \cdot v_A^2}{\delta_S \cdot V_S \cdot v_S^2}$$

where δ is the density of the particular stream, V is the volume of the particular stream, and v is the flow rate of the particular stream, the subscript A represents the axial stream and the subscript S represents the lateral stream.

9. The process of claim 1, wherein the flow cross-section widens steadily after the constriction.

10. The process of claim 1, wherein the number i of bores for the lateral streams is between $2 \leq i \leq m$, m being derived from the condition $$\frac{\pi \cdot D}{m \cdot d} \geq 1.1,$$

with D being the diameter of the constriction and d being the diameter of the bores.

11. The process of claim 1, wherein component B) is delivered to the nozzle at a temperature of at least 100° C..

12. In a process for the continuous production of polyurethane and polyurethane urea prepolymers by reaction of A) one or more organic polyisocyanates, with B) one or more isocyanate-reactive compounds having molecular weights of from 400 to 10,000 and being selected from the group consisting of polyhydroxy compounds, polyamine compounds, and mixtures thereof, C) optionally in the presence of one or more monofunctional compounds, and D) optionally in the presence of activators, stabilizers, lubricants and other additives, with the quantities of reactive components being selected such that the equivalent ratio of isocyanate groups to isocyanate-reactive groups is from 0.85:1 to 0.1:1, the improvement wherein the components are combined in a nozzle which has a constriction and wherein a) either the isocyanate-containing components or the isocyanate-reactive components are passed axially through the constriction of the nozzle, b) the other components are introduced laterally into the stream of components passing through the constriction via several bores distributed over the periphery of and in the walls of said constriction, and c) the resultant mixture passes through a pipe in which the components react to form a product stream.

* * * * *